United States Patent
Homma et al.

(10) Patent No.: US 8,896,544 B2
(45) Date of Patent: Nov. 25, 2014

(54) INFORMATION PROCESSING APPARATUS, INFORMATION PROCESSING METHOD, PROGRAM, AND INFORMATION PROCESSING SYSTEM

(75) Inventors: Fuminori Homma, Tokyo (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 751 days.

(21) Appl. No.: 12/603,045

(22) Filed: Oct. 21, 2009

(65) Prior Publication Data
US 2010/0149119 A1    Jun. 17, 2010

(30) Foreign Application Priority Data

Dec. 12, 2008  (JP) ................ P2008-316977

(51) Int. Cl.
- *G06F 3/041* (2006.01)
- *A63F 9/24* (2006.01)
- *G06K 15/00* (2006.01)
- *G06F 3/044* (2006.01)
- *H04M 1/2755* (2006.01)

(52) U.S. Cl.
CPC .............. *G06F 3/044* (2013.01); *H04M 1/2755* (2013.01); *H04M 2250/52* (2013.01)
USPC .............................. 345/173; 463/17; 235/383

(58) Field of Classification Search
USPC ........................................................ 345/173
See application file for complete search history.

(56) References Cited

U.S. PATENT DOCUMENTS

| | | | |
|---|---|---|---|
| 2007/0010311 A1* | 1/2007 | Irwin et al. | 463/17 |
| 2008/0005578 A1* | 1/2008 | Shafir | 713/186 |
| 2008/0165134 A1* | 7/2008 | Krah | 345/173 |
| 2008/0197193 A1* | 8/2008 | Overhultz et al. | 235/383 |
| 2009/0042306 A1* | 2/2009 | Reynolds et al. | 436/46 |
| 2009/0091530 A1* | 4/2009 | Yoshida | 345/156 |

FOREIGN PATENT DOCUMENTS

| | | |
|---|---|---|
| JP | 4-36822 | 2/1992 |
| JP | 2000-148376 | 5/2000 |

OTHER PUBLICATIONS

Japanese Office Action issued Oct. 5, 2010, in Patent Application No. 2008-316977.
U.S. Appl. No. 13/166,129, filed Jun. 22, 2011, Homma, et al.

* cited by examiner

*Primary Examiner* — Charles V Hicks
(74) *Attorney, Agent, or Firm* — Oblon, Spivak, McClelland, Maier & Neustadt, L.L.P.

(57) ABSTRACT

An information processing apparatus is provided which includes a read unit for reading pattern information formed by conductive material and an execution unit for executing a predetermined processing based on the pattern information read by the read unit.

5 Claims, 6 Drawing Sheets

BACKGROUND ART

INFORMATION PROCESSING APPARATUS, INFORMATION PROCESSING METHOD, PROGRAM, AND INFORMATION PROCESSING SYSTEM

BACKGROUND OF THE INVENTION

1. Field of the Invention

The present invention relates to an information processing apparatus, an information processing method, a program, and an information processing system, and in particular relates to those for performing arbitrary operation by using a touch screen.

2. Description of the Related Art

Figure 6:
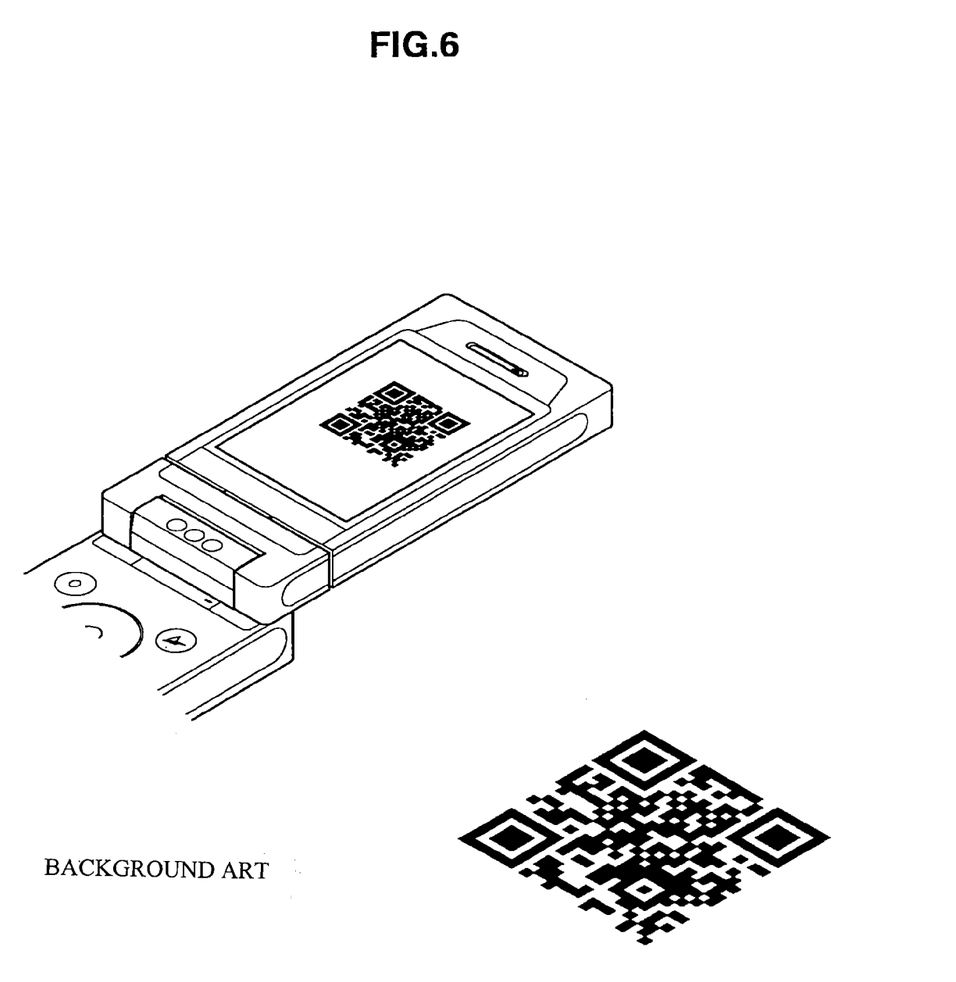
FIG. 6 is an explanatory diagram for explaining reading of QR code by a mobile phone with a built-in camera in the related art.

In recent years, among mobile and PHS phones with a built-in camera, QR code compatible terminals have been widely used. As shown in FIG. 6, a QR code is photographed by using a camera built in a QR code compatible mobile phone or PHS phone. Then, information such as a URL (Uniform Resource Locator) can be easily obtained by using the information content of the photographed QR code.

For example, a QR code containing a URL of, for example, a website having detailed information or a website for mobile phones is printed on a printed medium such as an advertisement or a map or displayed on the web screen. When information content of a QR code can be recognized by photographing the QR code by a mobile phone or the like, an access to the site designated by the URL can be facilitated. Moreover, by printing a QR code containing personal data on a business card, registration of the personal data to a mobile phone's address book can be also facilitated. Moreover, QR codes are started to be used for payment for online shopping and the like.

SUMMARY OF THE INVENTION

However, when pattern information of a QR code is recognized by using the camera of the mobile phone shown in FIG. 6 or the like, the camera had to be activated when used and the pattern information is detected by recognizing the image photographed by the camera, and there was therefore an issue of high power consumption. Moreover, distance and brightness for photographing the pattern information had to be secured, and there was therefore difficulty in detecting and recognizing pattern information of a QR code and the like when it was photographed in contact with the camera or in the dark.

Accordingly, the present invention has been made in light of the foregoing, and it is desirable to provide a novel and improved information processing apparatus, information processing method, program, and information processing system, capable of detecting and recognizing pattern information with easy operation.

According to an embodiment of the present invention, there is provided an information processing apparatus including a read unit for reading pattern information formed by conductive material, and an execution unit for executing a predetermined processing based on the pattern information read by the read unit.

With such configuration, pattern information formed by conductive material can be read and a predetermined processing can be performed based on the read pattern information. Because of this, pattern information can be detected and recognized without, for example, photographing the pattern information by a camera included in the information processing apparatus, and pattern information can be detected and recognized with easy operation.

Moreover, the read unit may read the pattern information by using a capacitive touch screen, and the read unit may read the pattern information when the pattern information is in contact with or in proximity to the capacitive touch screen.

Because of this, surrounding brightness does not have to be adjusted as when pattern information is photographed by a camera, and pattern information can be read even in the dark. Moreover, since the information processing apparatus can recognize pattern information by contacting or approaching it, the position of the information processing apparatus does not have to be adjusted such that pattern information falls within an imaging range.

Moreover, the information processing apparatus may include a determination unit for determining whether a read object read according to a user's operation is the pattern information or a finger, and when the determination unit determines that the read object is the pattern information, the read unit may read the pattern information.

With such configuration, by determining whether the read object is the pattern information, different processing can be performed between a case where the read object is the pattern information and the read object is the finger. Because of this, various processing appropriate for the read object can be executed.

Moreover, the read unit may digitize the read pattern information.

Moreover, the determination unit may determine whether the read object is pattern information or a finger based on the capacitance data characteristics of the read object.

Moreover, the determination unit may determine whether the read object is the pattern information, based on the capacitance data characteristics of the read object which includes at least one of edge characteristics, dynamic range, and frequency characteristics.

Moreover, according to another embodiment of the present invention, there is provided an information processing method including the steps of reading pattern information formed by conductive material, and executing a predetermined processing based on the read pattern information.

Moreover, according to another embodiment of the present invention, there is provided a program for causing a computer to function as an information processing apparatus including a read unit for reading pattern information formed by conductive material, and an execution unit for executing a predetermined processing based on the pattern information read by the read unit.

Moreover, according to another embodiment of the present invention, there is provided an information processing system including an information processing apparatus, and a medium containing pattern information formed by conductive material and readable by the information processing apparatus.

The information processing apparatus includes a read unit for reading the pattern information contained in the medium, and a execution unit for executing a predetermined processing based on the pattern information read by the read unit.

According to the embodiments of the present invention described above, pattern information can be detected and recognized with easy operation.

DETAILED DESCRIPTION OF THE EMBODIMENT

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The "detailed description of the embodiment" will be described in the following order:

[1] Object of Present Embodiment
[2] Outline of Information Processing System
[3] Hardware Configuration of Information Processing Apparatus
[4] Function Configuration of Information Processing Apparatus
[5] Operation of Information Processing Apparatus

[1] Object of Present Embodiment

In recent years, among mobile and PHS phones with a built-in camera, QR code compatible terminals have been widely used. As shown in FIG. 6, a QR code is photographed by using a camera built in a QR code compatible mobile phone or PHS phone. Then, information such as a URL (Uniform Resource Locator) can be easily obtained by using the information content of the photographed QR code.

For example, a QR code containing a URL of, for example, a website having detailed information or a website for mobile phones is printed on a printed medium such as an advertisement or a map or displayed on the web screen. When information content of a QR code can be recognized by photographing the QR code by a mobile phone or the like, an access to the site designated by the URL can be facilitated. Moreover, by printing a QR code containing personal data on a business card, registration of the personal data to a mobile phone's address book can be also facilitated. Moreover, QR codes are started to be used for payment for online shopping and the like.

However, when pattern information of a QR code is recognized by using the camera of the mobile phone shown in FIG. 6 or the like, the camera had to be activated when used and the pattern information is detected by recognizing the image photographed by the camera, and there was therefore an issue of high power consumption. Moreover, distance and brightness for photographing the pattern information had to be secured, and there was therefore difficulty in detecting and recognizing pattern information of a QR code and the like when it was photographed in contact with the camera or in the dark.

Accordingly, considering the above-mentioned situation, an information processing apparatus 100 according to the embodiment of the present invention has been made. With the information processing apparatus 100 according to the present embodiment, pattern information can be detected and recognized with easy operation.

The information processing apparatus 100 is exemplified by a mobile phone, PDA (Personal Digital Assistant) and the like in the present embodiment, but it is not limited thereto and can be applied to a personal computer and the like. Moreover, the information processing apparatus 100 is configured integrally with a display device such as a display, but it is not limited thereto and may be configured separately from the display device.

[2] Outline of Information Processing System

Next, an outline of an information processing system (not shown) including the information processing apparatus 100 will be described. The information processing system according to the present embodiment includes at least the information processing apparatus 100 and a medium containing pattern information formed by conductive material and readable by the information processing apparatus 100.

The functions of the information processing apparatus 100 will be described in detail later, but are mainly the functions of reading pattern information formed by conductive material spread on the medium and performing a predetermined processing based on the pattern information.

The pattern information formed by conductive material is exemplified by a QR code, for example. The QR code is an N by N code constituted by tiny square dots. The QR code has forty versions, from "version 1" where twenty-one tiny square dots are arranged in a row, to "version 40" where one hundred seventy-seven tiny square dots are arranged in a row.

The more the number of dots is, the more the information can be recorded, but the necessary area becomes greater. A predetermined cut-out symbol (finder pattern) is arranged at each of three corners of the QR code, which enables the information to be read accurately from any direction within 360 degrees.

The data capacity of the QR code is the maximum of 23,648 bits in the case of the version 40. Since the QR code uses an original character encoding, it can record up to 1,817 Kana and/or Kanji characters, 4,296 alphanumeric characters, or 7,089 numeric characters. Data is recorded redundantly, and therefore can be restored even when it is partially corrupted and unreadable. Tolerable error for QR code can be set to 4 levels from about 7% at the lowest to about 30% at the highest. The higher the tolerable data is, the more the redundant data is necessary, and the recordable data amount is therefore limited for that.

As described above, a QR code reading function has been mounted on mobile phones in recent years and QR codes have been widely used as a means that facilitates input of data such as a URL in the Internet which by button operation is bothering.

In the information processing system according to the present embodiment, pattern information containing characters and numerals like the above-mentioned QR code is formed by conductive material and described on a medium. The medium for describing the pattern information may be a paper medium or a foldable film. A conductive film can be used, too. In this case, the film itself may have conductivity or conductive material may be deposited on the film surface. Then, the information processing apparatus capable of reading the pattern information executes a predetermined processing based on the read pattern information. This enables the pattern information to be detected and recognized with easy operation.

[3] Hardware Configuration of Information Processing Apparatus

Figure 1:
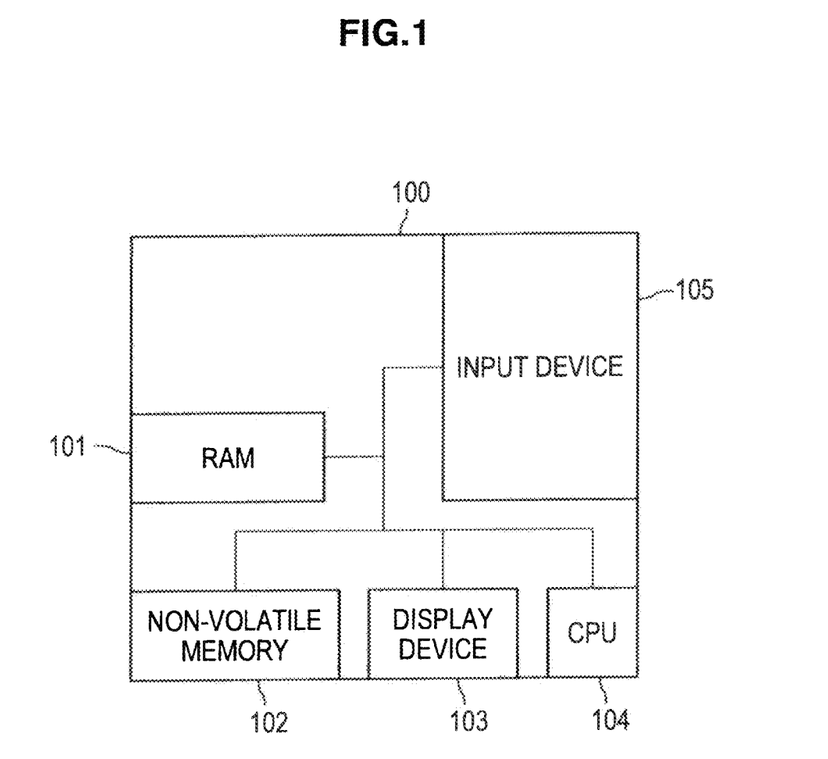
FIG. 1 illustrates a block diagram showing a hardware configuration of an information processing apparatus according to an embodiment of the present invention.

The outline of the information processing system has been described above. Next, a hardware configuration of the information processing apparatus 100 according to the present embodiment will be described based on FIG. 1. FIG. 1 illustrates a block diagram showing the hardware configuration of the information processing apparatus 100 according to the present embodiment.

The information processing apparatus 100 includes a RAM (Random Access Memory) 101, a non-volatile memory 102, a display device 103, a CPU (Central Processing Unit) 104, and an input device 105, for example.

The CPU 104 functions as an arithmetic processing device and a control device, and controls the overall operation within the information processing apparatus 100. Moreover, the CPU 104 may be a microprocessor. The non-volatile memory 102 stores programs, operation parameters and the like used by the CPU 104. The RAM 101 temporarily stores the program executed by the CPU 104, the parameter which properly changes in the execution, and the like. These are connected each other via a host bus (not referred) including a CPU bus and the like.

The display device 103 is one example of an output device included in the information processing apparatus 100. The display device 103 is constituted by, for example, a liquid crystal display (referred to as LCD hereinafter) and output a result obtained by various processing executed by the information processing device 100. Specifically, the display device 103 displays the result obtained by various processing executed by the information processing device 100 as text or image.

The input device 105 is constituted by, for example, an input means for a user to input information, such as a mouse, a keyboard, a touch screen, a button, a microphone, a switch and a lever, and an input control circuit for generating input signals based on the input by the user and outputting them to the CPU 104. The user of the information processing apparatus 100 can input various data into and give an instruction of processing operation to the information processing device 100.

In the present embodiment, a touch screen is mainly used to detect a subject of operation such as a user's finger and to read pattern information formed by conductive material. The touch screen has two functions of display and input. The touch screen according to the present embodiment can detect a user's finger or pattern information in contact therewith or in proximity thereto.

The detection method includes any method capable of detecting a subject of operation or pattern information in contact with or in proximity to the display, such as a resistive method of using a metallic thin film forming a transparent electrode, a capacitive method of detecting the change in capacitance between a fingertip and a conductive layer to detect a location, an infrared ray shielding method, or an electromagnetic induction method.

Figure 2:
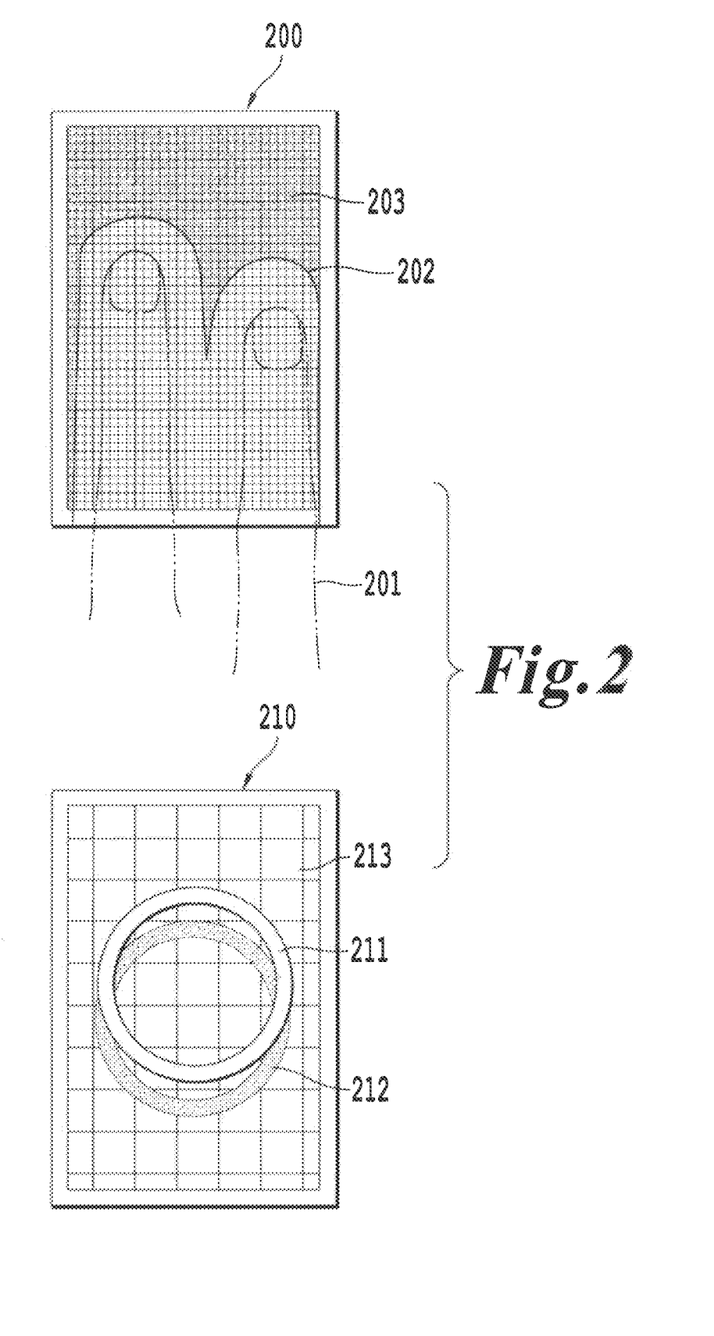
FIG. 2 illustrates explanatory diagrams for explaining a method for detecting a subject of operation by a capacitive touch screen according to the embodiment.

In particular, a capacitive touch screen is used to detect a subject of operation and pattern information in the present embodiment. Here, method for detecting a subject of operation (finger) by the capacitive touch screen will be described referring to FIG. 2. FIG. 2 illustrates explanatory diagrams for explaining the method for detecting the subject of operation by the capacitive touch screen. As shown in an explanatory diagram 200 in FIG. 2, the capacitive touch screen includes electrostatic sensors arranged in a reticular pattern (e.g., 10×7) and changes values of the electrostatic sensors according to the change in capacitance.

When a user's finger which is the subject of operation is in proximity to or in contact with the electrostatic sensors of the capacitive touch screen, the capacitance of the electrostatic sensors increases. Based on the change of the increment, interaction such as tapping is generally performed. Moreover, capacitances of the each electrostatic sensor can be obtained at the same time. In this case, the shape of the finger in proximity to or in contact with the capacitive touch screen can be detected by detecting and interpolating the changes in capacitances of all the electrostatic sensors of the capacitive touch screen at the same time.

The detection of the shape of the finger in proximity to or in contact with the capacitive touch screen will be described referring to the explanatory diagram 200 in FIG. 2. In the explanatory diagram 200, a region where the capacitance of the electrostatic sensors increases is shown as a region 202 and a region where the capacitance of the electrostatic sensors does not change is shown as a region 203. When a subject of operation (finger) 201 is in proximity to or in contact with, the capacitance of the electrostatic sensors increases. Accordingly, as shown in the explanatory diagram 200, the shape of the region 202 changes along the shape of the subject of operation 201, and the shape of the subject of operation 201 can be therefore detected.

Moreover, the change in capacitance of conductive metal such as aluminum can be obtained by using the capacitive touch screen described above. This is because the capacitance of the conductive metal such as aluminum uniformly changes due to its properties. That is, when such conductive material is in proximity to or in contact with a capacitive touch screen with relatively high resolution, the change in capacitance can be uniformly obtained along the shape of the material.

The explanatory diagram 210 in FIG. 2 explains the change in capacitance when a conductive material 211 is in contact with or in proximity to the capacitive touch screen. As shown in FIG. 2, the capacitance of a region 212 formed by the conductive material on a medium changes. On the other hand, the capacitance of a region 213 where conductive material is not spread on the medium does not change. In such a manner, the shape of the conductive material 211 in proximity to or in contact with the capacitive touch screen can be read by detecting the change in the capacitance.

The hardware configuration of the information processing apparatus 100 according to the present embodiment has been described above. Each of the above components may be constituted by versatile members or by hardware dedicated to the functions of the each component. Accordingly, hardware configuration to be used can be appropriately changed according to the technological level of the time when each embodiment is carried out.

[4] Function Configuration of Information Processing Apparatus

Figure 3:
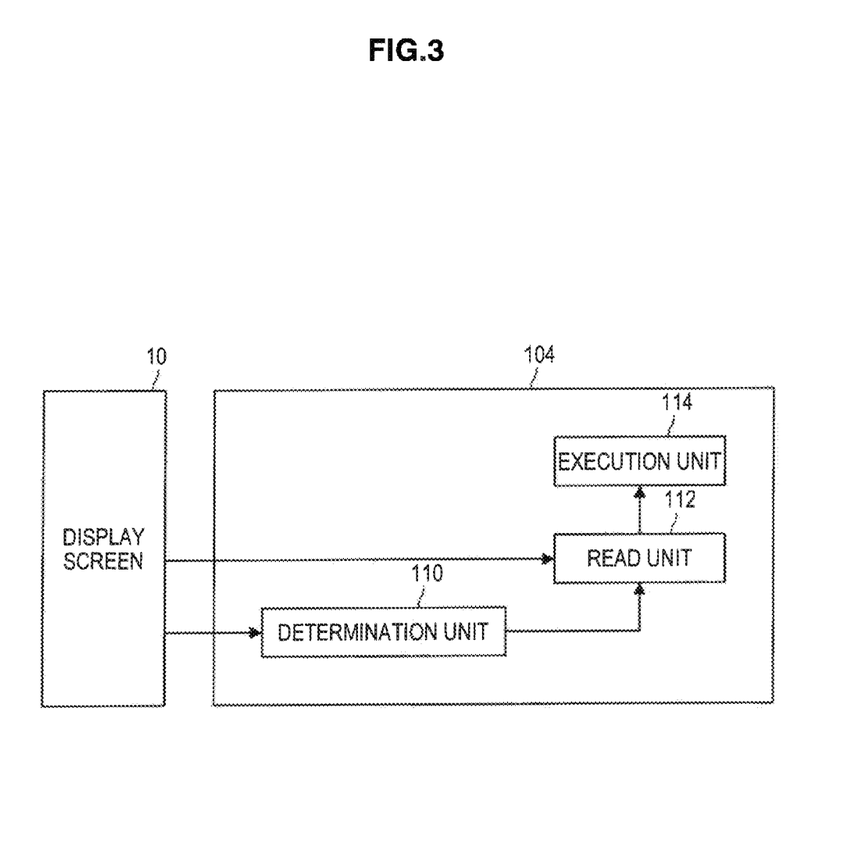
FIG. 3 is a block diagram showing a function configuration of a control unit of the information processing apparatus according to the embodiment.

Next, functions of a control unit of the information processing apparatus 100 according to the present embodiment will be described. FIG. 3 is a block diagram showing a function configuration of the control unit (CPU 104) of the information processing apparatus 100 according to the present embodiment.

As shown in FIG. 3, the control unit of the information processing apparatus 100 includes, for example, a determination unit 110, a read unit 112, and an execution unit 114. A display screen 10 shown in FIG. 3 has a touch screen function as the input device 105 described above and a LCD function as the display device 103.

The determination unit 110 has a function of determining whether a read object read according to a user's operation is pattern information or a user's finger. It can be determined whether the read object is pattern information or a user's finger based on the data characteristics of the read object. The data characteristics of the read object can be exemplified by edge characteristics, dynamic range, and frequency characteristics of the read object, for example. The determination unit 110 has a function of providing a result of the determination of whether the read object is pattern information or a user's finger to the read unit 112.

The read unit 112 has a function of reading pattern information formed by conductive material. Moreover, when the determination unit 110 determines that the read object is pattern information such as a QR code or the like, the read unit 112 may read the pattern information. The read unit 112 digitalizes the read pattern information and provides the digitized information to the execution unit 114.

Figure 4:
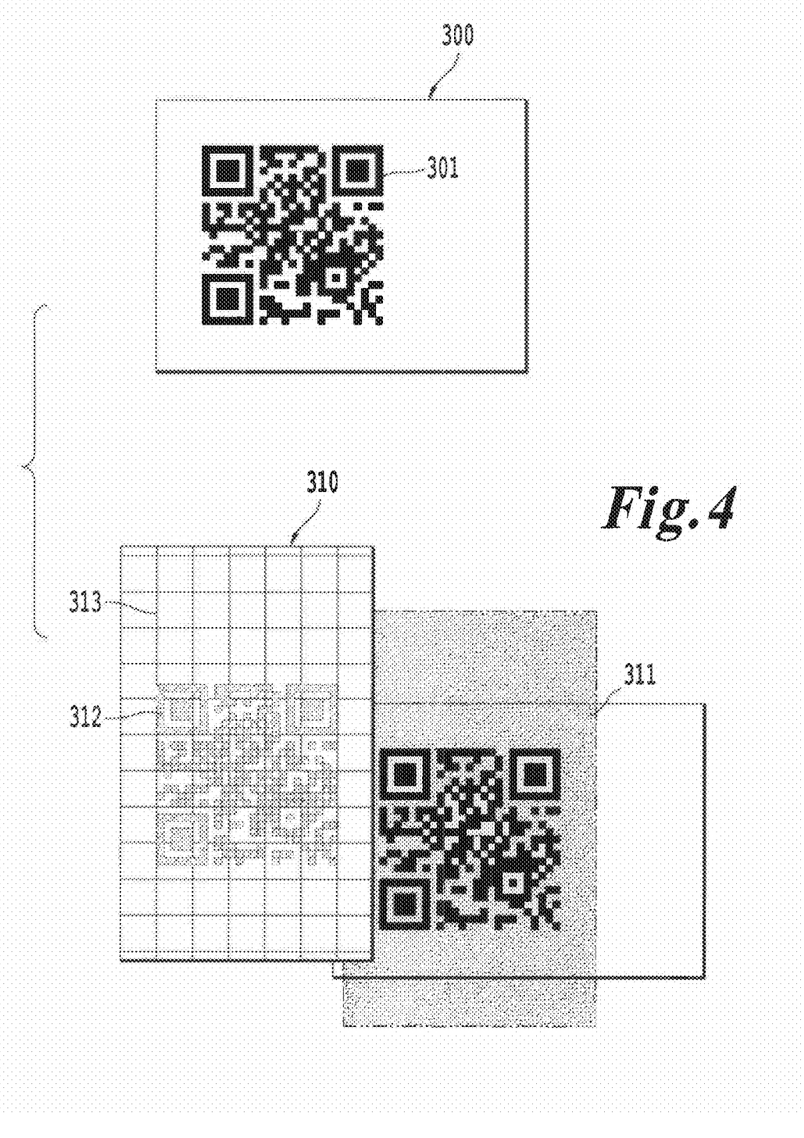
FIG. 4 shows explanatory diagrams for explaining reading of pattern information by using the capacitive touch screen according to the embodiment.

Here, reading of pattern information using a capacitive touch screen by the read unit 112 will be described referring to FIG. 4. FIG. 4 explains a case where pattern information formed by conductive material is a QR code. For example, a QR code 301 formed using conductive ink is described on a medium 300 as shown in FIG. 4.

The information processing apparatus 100 including a capacitive touch screen is brought into proximity or contact with the QR code 301 by a user. As described above, the determination unit 110 determines whether a read object is pattern information such as a QR code or the like or a user's finger by the edge characteristics and the like of the read object. When the determination unit 110 determines that the read object is pattern information such as a QR code or the like, the read unit 112 reads the pattern information such as a QR code or the like described on the medium 300.

An explanatory diagram 310 in FIG. 4 explains information about capacitance change detected when the capacitive touch screen is in proximity to or in contact with the medium. As shown in the explanatory diagram 310 in FIG. 4, capacitance change can be detected as shown in a region 312 based on information formed by metal and formed along the shape of the QR code 311. A region 313 not having information formed by metal is a region where capacitance does not change.

For example, the capacitive touch screen may be installed on the surface opposite to the display screen of the information processing apparatus 100, and the detected change in capacitance of the QR code may be displayed on the display screen (LCD). Moreover, a predetermined processing may be executed without displaying the QR code detected by the capacitive touch screen on the display screen.

Moreover, it is only necessary that pattern information such as a QR code or the like is formed by conductive material and the pattern information does not have to be visible or, if visible, may be different from the actual pattern information.

Moreover, the pattern information may be not only code information such as a QR code but also characters and/or numerals themselves. In this case, the read unit 112 reads pattern information such as the characters and/or numerals.

Furthermore, code information may be embedded in the characters and/or numerals and digital watermarking technology may be used. In this case, the read unit 112 reads the characters and/or numerals as well as the code information embedded in the characters and/or numerals.

Moreover, the pattern information may be two-dimensional information such as a QR code or the like, or may be three-dimensional information. In the case of the three-dimensional information, it is read by changing metal concentration spread on the medium. In such a manner, a capacitive touch screen is used to read pattern information, and thereby pattern information can be read accurately by approaching or contacting the medium without worrying about the surrounding brightness or the distance to the medium.

Although the case where a capacitive touch screen is included in the information processing apparatus 100 has been described above, the present invention is not limited thereto and the input device may be another device capable of reading pattern information. For example, pattern information may be represented in concave and convex and a resistive method may be used to read it, or infrared ray shielding method or an electromagnetic induction method may be used.

Returning to FIG. 3, the execution unit 114 has a function of executing a predetermined processing based on the pattern information read by the read unit 112. As described above, the read unit 112 digitalizes the read pattern information and provides the digitized information to the execution unit 114. The execution unit 114 executes a predetermined processing based on the digitized information. For example, if the information provided from the read unit 112 is URL information, the execution unit 114 accesses a web site designated by the URL via an application of the information processing apparatus 100.

As described above, when the pattern information is characters and/or numerals, for example, information such as a URL is read as character information and the execution unit 114 accesses a web site based on the information. Moreover, when the pattern information is characters and/or numerals and code information is embedded in the characters and the like, the execution unit 114 may execute a predetermined processing based on the embedded code information.

Moreover, information for requesting an input of a PIN code or the like from a user may be included in the pattern information. In this case, when executing a predetermined processing, the execution unit 114 may execute the processing only if the user enters his/her PIN code.

In such a manner, pattern information itself formed by conductive material may be detected and recognized, or information embedded in pattern information may be detected and recognized.

[5] Operation of Information Processing Apparatus

Figure 5:
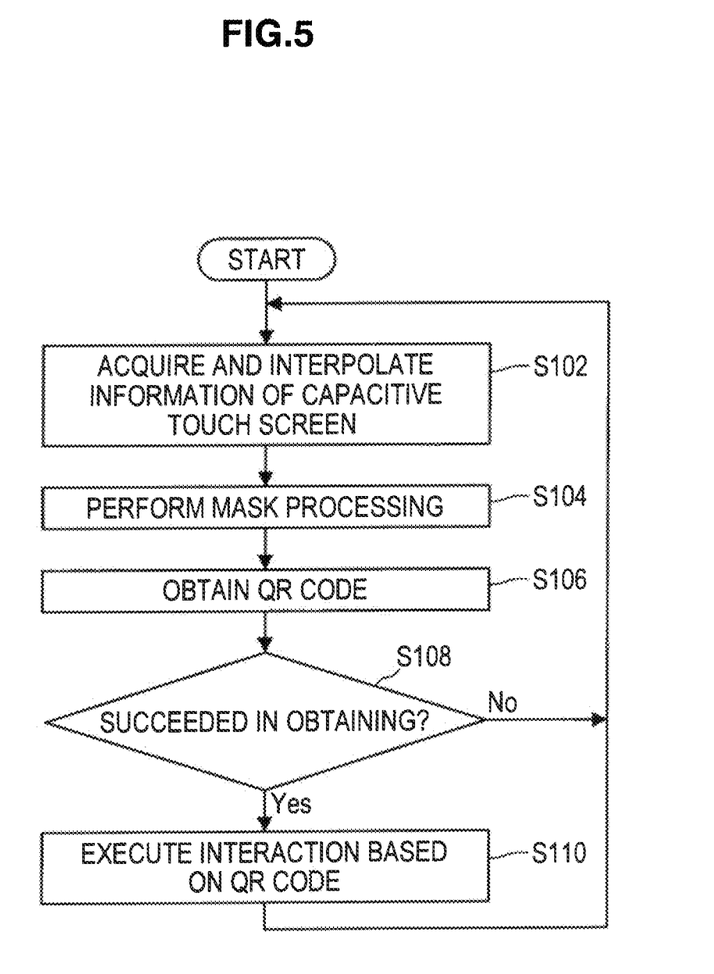
FIG. 5 is a flow chart for explaining an information processing method of the information processing apparatus according to the embodiment.

The functions of the control unit of the information processing apparatus 100 have been described above. Next, an information processing method of the information processing apparatus 100 will be described referring to FIG. 5. FIG. 5 is a flow chart for explaining the information processing method of the information processing apparatus 100. A case where the information processing apparatus 100 includes a capacitive touch screen will be described in the following.

First, the information processing apparatus 100 generates a thread for monitoring the change in capacitance of the capacitive touch screen when a predetermined application is started. Then, the determination unit 110 obtains capacitances of the each electrostatic sensor of the capacitive touch screen and interpolates them at arbitrary resolution (S102).

At the step 102, the determination unit 110 compares the capacitance at the time of application start-up and the capacitance at the time when the capacitive touch screen is in proximity to or in contact with a read object, and obtains the calculated difference and interpolates them at arbitrary resolution.

The determination unit 110 determines whether the read object is pattern information or a user's finger based on the amount of change in capacitance obtained and interpolated at the step S102. As described above, whether the read object is pattern information or a user's finger is determined based on the capacitance data characteristics of the read object such as edge characteristics, dynamic range, and frequency characteristics.

Then, the determination unit 110 provides a result of the determination to the read unit 112. When the determination unit 110 determines that the read object is pattern information, the read unit 112 discretizes at certain intervals the calculated value of change in capacitance and executes mask processing (digitization) (S104). When the read object is a QR code, the read unit 112 reads the QR code formed by conductive material.

The pattern information discretized and masked at the step S104 is provided to the execution unit 114. Then, the execution unit 114 executes a predetermined processing based on the provided pattern information. When the pattern information is a QR code, the execution unit 114 analyzes the QR code following an analysis procedure of QR codes and obtains the QR code (S106).

As described above, when the pattern information is characters and/or numerals, the execution unit 114 executes a predetermined processing based on the content of the characters and/or numerals read by the read unit 112. Furthermore, when code information is embedded in the characters and the like, the execution unit 114 executes a predetermined processing based on the embedded code information.

Then, whether the QR code is successfully obtained at the step S106 is determined (S108). When it is determined that the QR code is successfully obtained at the step S108, the execution unit 114 executes a processing (interaction) based on an operation instruction and information such as a URL or the like based on the QR code (S110).

For example, when URL information is stored in the QR code, the execution unit 114 accesses a web site designated by the URL. Moreover, when personal data such as name, address and other personal details are stored in the QR code, for example, the execution unit 114 registers the personal data to an address book included in the information processing apparatus 100. Moreover, when payment information of online shopping or the like is stored in the QR code, the execution unit 114 executes payment processing by using electronic money.

With the information processing apparatus 100 according to the present embodiment, pattern information formed by conductive material can be read and a predetermined processing can be executed based on the read pattern information. Moreover, whether a read object is pattern information or a finger can be determined and when it is determined as pattern information, the pattern information can be read.

Because of this, pattern information in proximity to or in contact with the information processing apparatus 100 can be detected and recognized. For example, when pattern information is a QR code, a predetermined processing can be executed based on the QR code by bringing the information processing apparatus 100 into proximity to or contact with the QR code.

Since the method described above consumes less power than the method of reading pattern information by photographing it by a camera included in the information processing apparatus 100, reading processing of pattern information can be continuously executed. Moreover, the method described above does not demand explicit interaction such as turning on a camera at the time of photographing.

Furthermore, a QR code reading function can be added to the capacitive touch screen. Because of this, an existing device using a touch screen can be reused and the size and the production cost of the information processing apparatus 100 can be reduced.

Moreover, although surrounding brightness has to be adjusted when pattern information is photographed by a camera, according to the present embodiment, pattern information can be read in the dark. Furthermore, since the information processing apparatus 100 can recognize pattern information by contacting it, the position of the information processing apparatus 100 does not have to be adjusted such that pattern information falls within an imaging range.

Moreover, although a QR code printed on a paper medium can be easily duplicated, pattern information formed by conductive material cannot be easily duplicated, which thus can enhance security. For example, by putting an arbitrary panel on a QR code formed by conductive material to make duplication more difficult, information can be prevented from, for example, being altered.

Although a preferred embodiment of the present invention is described in the foregoing with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2008-316977 filed in the Japan Patent Office on 12 Dec. 2008, the entire content of which is hereby incorporated by reference.

What is claimed is:

1. An information processing apparatus comprising:
a reader configured to read pattern information formed by conductive material and an input from a user's finger, the pattern information having an embedded code for accessing data;
circuitry configured to:
determine whether a read object read according to the user's operation is one of the pattern information and the finger based on capacitance data characteristics of the read object which includes at least one of edge characteristics, dynamic range, and frequency characteristics, and without detecting any visible information or capturing an image of the read object, wherein when the circuitry determines that the read object is the pattern information, the reader reads the pattern information, without detecting any visible information or capturing an image of the pattern information, and obtains the embedded code; and
execute a predetermined processing based on the pattern information read by the reader,
wherein the reader reads the pattern information and the input from the user's finger by using a capacitive touch screen which receives an input at a same surface as a display screen of the information processing apparatus, and the reader reads the pattern information, without detecting any visible information or capturing an image of the pattern information, when the pattern information is in contact with or in proximity to the capacitive touch screen.

2. The information processing apparatus according to claim 1, wherein
the reader digitizes the read pattern information.

3. An information processing method, implemented on a information processing apparatus, comprising the steps of:
reading pattern information formed by conductive material, without detecting any visible information or capturing an image of the pattern information, by a reader of the information processing apparatus that is configured to read the pattern information and an input from a user's finger, the pattern information having an embedded code for accessing data;
determining, by circuitry of the information processing apparatus, whether a read object read according to a user's operation is one of the pattern information and the finger based on capacitance data characteristics of the read object which includes at least one of edge characteristics, dynamic range, and frequency characteristics, and without detecting any visible information or capturing an image of the read object, and when determining that the read object is the pattern information, the reader reads the pattern information, without detecting any visible information or capturing an image of the pattern information, and obtains the embedded code; and
executing a predetermined processing based on the read pattern information,
wherein the reader reads the pattern information and the input from the user's finger by using a capacitive touch screen which receives an input at a same surface as a display screen of the information processing apparatus, and
the reader reads the pattern information, without detecting any visible information or capturing an image of the pattern information, when the pattern information is in contact with or in proximity to the capacitive touch screen.

4. A non-transitory computer readable storage medium storing a program for causing an information processing apparatus to perform a method comprising:
reading pattern information formed by conductive material, without detecting any visible information or capturing an image of the pattern information, by a reader of the information processing apparatus that is configured to read the pattern information and an input from a user's finger, the pattern information having an embedded code for accessing data;
determining, by circuitry of the information processing apparatus, whether a read object read according to a user's operation is one of the pattern information and the finger based on capacitance data characteristics of the read object which includes at least one of edge characteristics, dynamic range, and frequency characteristics, and without detecting any visible information or capturing an image of the read object, and when determining that the read object is the pattern information, the reader reads the pattern information, without detecting any visible information or capturing an image of the pattern information, and obtains the embedded code; and
executing a predetermined processing based on the read pattern information,
wherein the reader reads the pattern information and the input from the user's finger by using a capacitive touch screen which receives an input at a same surface as a display screen of the information processing apparatus, and
the reader reads the pattern information, without detecting any visible information or capturing an image of the pattern information, when the pattern information is in contact with or in proximity to the capacitive touch screen.

5. An information processing system comprising:
an information processing apparatus; and
a medium containing pattern information formed by conductive material and readable by the information processing apparatus,
wherein
the information processing apparatus includes
a reader configured to read the pattern information contained in the medium and an input from a user's finger, the pattern information having an embedded code for accessing data,
circuitry configured to:
determine whether a read object read according to the user's operation is one of the pattern information and the finger based on capacitance data characteristics of the read object which includes at least one of edge characteristics, dynamic range, and frequency characteristics, and without detecting any visible information or capturing an image of the read object, wherein when the circuitry determines that the read object is the pattern information, the reader reads the pattern information, without detecting any visible information or capturing an image of the pattern information, and obtains the embedded code; and
execute a predetermined processing based on the pattern information read by the reader,
wherein the reader reads the pattern information and the input from the user's finger by using a capacitive touch screen which receives an input at a same surface as a display screen of the information processing apparatus, and
the reader reads the pattern information, without detecting any visible information or capturing an image of the pattern information, when the pattern information is in contact with or in proximity to the capacitive touch screen.

* * * * *